United States Patent
Wei et al.

(10) Patent No.: US 10,068,249 B1
(45) Date of Patent: Sep. 4, 2018

(54) INVENTORY FORECASTING FOR BIDDED AD EXCHANGE

(75) Inventors: Liang Wei, Seattle, WA (US); Saurabh Sharma, Seattle, WA (US); Sumedh A. Kanetkar, Seattle, WA (US); Timothy Shawn T. Wee, Seattle, WA (US); Weifeng Aaron Lin, Issaquah, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 790 days.

(21) Appl. No.: 13/486,396

(22) Filed: Jun. 1, 2012

(51) Int. Cl.
*G06Q 30/00* (2012.01)
*G06Q 30/02* (2012.01)
*G06Q 10/08* (2012.01)

(52) U.S. Cl.
CPC ....... *G06Q 30/0254* (2013.01); *G06Q 10/087* (2013.01); *G06Q 30/0241* (2013.01); *G06Q 30/0244* (2013.01); *G06Q 30/0246* (2013.01); *G06Q 30/0261* (2013.01)

(58) Field of Classification Search
CPC ........... G06Q 30/0242; G06Q 30/0275; G06Q 30/0254; G06Q 30/0251; G06Q 30/0261; G06Q 30/0264; G06Q 30/0255; G06Q 30/02; G06Q 30/0276; G06Q 30/0269
See application file for complete search history.

(56) References Cited

U.S. PATENT DOCUMENTS

| | | | |
|---|---|---|---|
| 5,950,178 A * | 9/1999 | Borgato | G06Q 30/06 705/35 |
| 8,719,082 B1 * | 5/2014 | Snyder | G06Q 90/00 705/14.1 |
| 2005/0216391 A1 * | 9/2005 | Tews | G06Q 30/02 705/37 |
| 2008/0275757 A1 * | 11/2008 | Sharma et al. | 705/10 |
| 2010/0268609 A1 * | 10/2010 | Nolet | G06Q 30/02 705/14.71 |
| 2011/0040636 A1 * | 2/2011 | Simmons et al. | 705/14.71 |
| 2012/0030034 A1 * | 2/2012 | Knapp et al. | 705/14.71 |
| 2012/0041816 A1 * | 2/2012 | Buchalter | 705/14.41 |
| 2012/0239468 A1 * | 9/2012 | Yerneni et al. | 705/14.4 |
| 2012/0278129 A1 | 11/2012 | Salomatin et al. | |
| 2012/0310729 A1 * | 12/2012 | Dalto et al. | 705/14.43 |
| 2013/0055097 A1 | 2/2013 | Soroca et al. | |

OTHER PUBLICATIONS

Jagdish Hiray, Time-series methods of forecasting—All about Business and Management, Feb. 21, 2008, Wordpress.*

(Continued)

*Primary Examiner* — Jamie R Kucab
(74) *Attorney, Agent, or Firm* — Thomas Horstemeyer, LLP

(57) ABSTRACT

Disclosed are various embodiments for determining an expected number of times that content may be served in conjunction with a user interface. A forecasting model for determining an expected bid requests inventory is generated, wherein a bid request indicates an opportunity to submit a bid to present content in conjunction with a user interface. A bid success rate is determined. An expected impressions inventory is determined based on the expected bid requests inventory and the bid success rate.

28 Claims, 7 Drawing Sheets

(56) References Cited

OTHER PUBLICATIONS

John C. Chambers, Satinder K. Mullick and Donald D. Smith, How to Choose the Right Forecasting Technique, Jul. 1971, Harvard Business Review.*
Jagdish Hiray article "Time-series methods of forecasting".*
Chambers et al. article "How to Choose the Right Forecasting Technique".*
Jagdish Hiray article "Time-series methods of forecasting" (Year: 2008).*
Chambers et al. article "How to Choose the Right Forecasting Technique" (Year: 1971).*
U.S. Appl. No. 13/275,071, filed Oct. 17, 2011 (Related case, copy not included).

* cited by examiner

INVENTORY FORECASTING FOR BIDDED AD EXCHANGE

BACKGROUND

Advertisers may pay for advertisements to be presented in conjunction with network pages, such as web pages and other network content. Additionally, advertisers may desire that the advertisements be presented to members of a particular audience.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

A network page, such as a web page, may include space for content, such as an advertisement, to be presented. In many cases, upon a visitor accessing a network page, bid requests are transmitted to multiple third-parties. The bid requests indicate an opportunity for the third-parties to submit bids for the right to present their content in conjunction with the network page. So that the third-parties may determine whether to bid and the amount at which they are willing to pay at a maximum, the bid requests may include information describing characteristics of the visitor, the network page, and possibly other characteristics.

In accordance with the present disclosure, an impressions inventory forecasting engine may obtain data for historical bid requests. From the historical bid requests, the impressions inventory forecasting engine may determine an expected quantity of bid requests for a time period in the future. Additionally, the impressions inventory forecasting engine may determine historical bid success rates for a range of historical bid amounts. By applying the historical bid success rates towards the expected quantity of bid requests, a range of expected advertising inventories based on the various bid amounts may be determined. In the following discussion, a general description of the system and its components is provided, followed by a discussion of the operation of the same.

Figure 1:
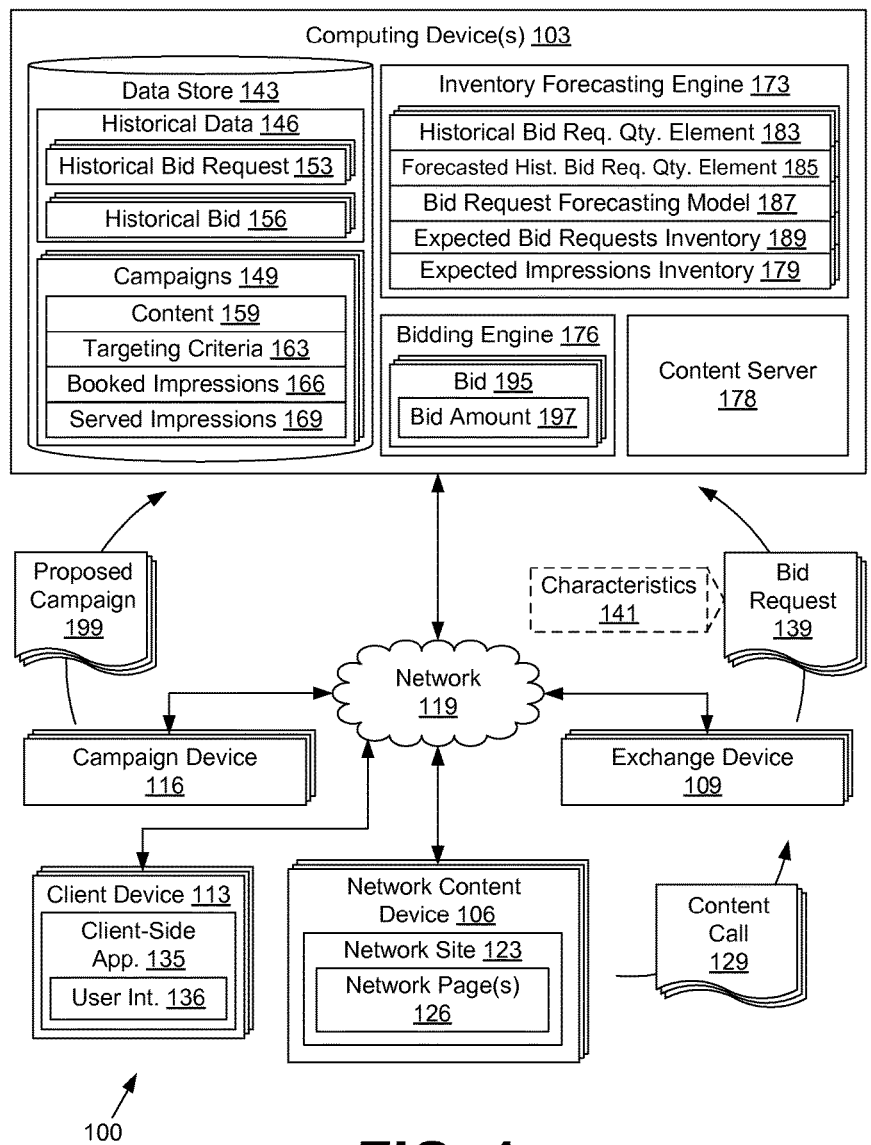
FIG. 1 is a drawing of network environment according to various embodiments of the present disclosure.

With reference to FIG. 1, shown is a network environment 100 according to various embodiments. The network environment 100 may include, for example, one or more computing devices 103, network content devices 106, exchange devices 109, client devices 113, and campaign devices 116 in communication through a network 119. The network 119 includes, for example, the Internet, intranets, extranets, wide area networks (WANs), local area networks (LANs), wired networks, wireless networks, or other suitable networks, etc., or any combination of two or more such networks.

The computing device 103, network content device 106, and/or exchange device 109 may comprise, for example, a server computer or any other system providing computing capability. Alternatively, a plurality of computing devices 103, network content devices 106, and/or exchange devices 109 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing devices 103, network content devices 106, and exchange devices 109 are referred to herein in the singular. Even though the computing device 103, network content device 106, and exchange device 109 are referred to in the singular, it is understood that a plurality of computing devices 103, network content devices 106, and/or exchange devices 109 may be employed in the various arrangements as described above.

The network content device 106 may be configured to serve data and/or maintain a network site 123 to provide a network presence for various purposes. To this end, the network site 123 may include a network page server that serves data such as network pages 126 to client devices 113 over a protocol such as hypertext transfer protocol (HTTP), simple object access protocol (SOAP), and/or other protocols. Such a network page server may comprise a commercially available network page server such as, for example, Apache® HTTP Server, Microsoft® Internet Information Services (IIS), and/or other network page servers.

A network page 126 may be network content that is suitable for transfer through the network 119 and rendering on a client device 113 or other type of device. To this end, the network pages 126 may be in the form of HTML, XHTML, or other type of format.

The network content device 106 may also be configured to generate a content call 129 that is transmitted to the exchange device 109. The content call 129 may be generated, for example, upon a client device 113 accessing a network page 126 or obtaining data from the network content device 106. The content call 129 may indicate that there is a space (e.g., "slot") available for advertising or other purposes.

Each content call 129 may include information associated with the space that is available. As non-limiting examples, the behavior/advertising segments to which the visitor of the network content device 106 is associated, the geographical location of the visitor who accessed the network content device 106, the location of the space (e.g. "slot") with respect to the network page 126, the size of the space, and/or possibly other information may be transmitted with the content call 129.

The client device 113 may comprise, for example, a processor-based system such as a computer system. Such a computer system may be embodied in the form of a desktop computer, a laptop computer, a personal digital assistant, a cellular telephone, a set-top box, a music player, a web pad, a tablet computer system, a game console, or other device with like capability.

The client device 113 may be configured to execute various applications such as a client-side application 135 and/or other applications. The client-side application 135 may be executed in the client device 113, for example, to access and render network pages 126 or other network content served up by the network content device 106 and/or other devices. To this end, the client-side application 135 may be embodied in the form of, for example, a browser configured to access and browse network pages 126. In various alternative embodiments, the client-side application 135 may be embodied in the form of a stand-alone application that provides space for network content.

The client-side application 135 may generate a user interface 136 to facilitate user interaction with and control of the client-side application 135. The user interface 136 may also present renderings of the network pages 126 and/or various other network content, as may be appreciated. The user interface 136 may include space for advertising or other types of network content as well.

The exchange device 109 may provide an electronic bidding exchange for bidding on, buying, and/or selling space that becomes available on the user interface 136. To this end, the exchange device 109 may generate bid requests 139 upon the exchange device 109 obtaining a content call 129 from a network content device 106, for example, that may be transmitted to the computing device 103. As viewed from the computing device 103, the bid request 139 may indicate an opportunity to submit an offer to present network content in conjunction with the user interface 136. It is noted that, in various alternative embodiments, the exchange device 109 may be embodied as a part of the computing device 103, or the exchange device 109 may be in direct communication with the computing device 103.

The bid request 139 may include characteristics 141 describing various information associated with the space that is available for network content to be presented. As non-limiting examples, the characteristics 141 may be the behavior/advertising segments to which the visitor who accessed the network content device 106 is associated, the geographical location of the visitor who accessed the network content device 106, the location of the space (e.g. "slot") with respect to the user interface 136, the size of the space, and/or possibly other information. Some of the characteristics 141 may be generalized and/or masked for various purposes. For example, a portion of an identification string for the network page 126 may be masked so that the general category of the network page 126 is identifiable but the specific network page 126 is not revealed.

The computing device 103 may execute various applications and/or other functionality according to various embodiments. Also, various data is stored in a data store 143 that is accessible to the computing device 103. As may be appreciated, the data store 143 may be representative of a plurality of data stores. The data stored in the data store 143, for example, is associated with the operation of the various applications and/or functional entities described herein.

The data stored in the data store 143 includes, for example, historical data 146, a listing of campaigns 149, and potentially other data. The historical data 146 may include data that has been collected by the computing device 103 and/or other devices in conjunction with the exchange device 109. For example, the historical data 146 may include data representing historical bid requests 153, historical bids 156, and potentially other data.

A historical bid request 153 may be a recording of a previous bid request 139 that had been received by the computing device 103 or another device. Associated with each historical bid request 153 may be, for example, characteristics 141 associated with the corresponding bid request 139. Additionally, the historical bid request 153 may include the time of the historical bid request 153 and potentially other information.

The historical bids 156 may be recordings of previous offers to purchase space through the exchange device 109. For example, the historical bids 156 may have been placed in response to a historical bid request 153. A historical bid amount (i.e., bid price), whether the historical bid 156 was successful (i.e., the "winning" bid), and possibly other information may also be stored in association with the historical bid 156 in the data store 143.

A campaign 149 may be an organized effort to have content 159 served in conjunction with the user interfaces 136. The content 159 may be, for example, advertisements or other types of creatives or network content. In various embodiments, the content 159 may be represented by an HTML snippet, for example. The campaigns 149 may also have specified targeting criteria 163 for serving the content 159. For example, the targeting criteria 163 may be that the content 159 is to target particular behavioral/advertising segment(s) (e.g., age, gender, etc.), particular times, visitors associated with particular geographical locations (i.e., geo-targeting), particular locations with respect to the user interface 136 (i.e., the "slot"), particular sized spaces on the user interface 136 or any other type of targeting criteria 163. Additionally, the targeting criteria 163 may define a limit on the number of times the content 159 may be served within a predefined time period, for example. As another non-limiting example, the targeting criteria 163 may define that the content 159 is to be served entirely within a predefined time period. As an even further non-limiting example, the targeting criteria 163 may define a limit on the frequency at which the content 159 may be served to a particular client device 113.

Additionally, the data store 143 may store information for booked impressions 166 and served impressions 169 for the campaigns 149. A booked impression 166 may be an obligation for the computing device 103 to cause an instance of the content 159 to be served in conjunction with a user interface 136. Similarly, a served impression 169 may be a recording of an instance of the content 159 being served on in conjunction with a user interface 136. For example, the quantity of booked impressions 166 and quantity of served impressions 169 may be stored in the data store 143.

The components executed on the computing device 103 include, for example, an inventory forecasting engine 173, a bidding engine 176, a content server 178, and other applications, services, processes, systems, engines, or functionality not discussed in detail herein. The inventory forecasting engine 173 may be executed to determine an expected impressions inventory 179. The expected impressions inventory 179 may be an estimate of the quantity of times that content 159 for a particular campaign 149 or campaigns 149 may be served for rendering in conjunction with a user interface 136.

In order to determine the expected impressions inventory 179, the inventory forecasting engine 173 may also determine historical bid request quantity elements 183, forecasted historical bid request quantity elements 185, bid requests forecasting models 187, expected bid requests inventories 189, and possibly other information not discussed in detail herein. A historical bid request quantity element 183 may represent quantities of historical bid requests 153 that were recorded during a particular time period, such as a day, week, or other time period. For example, a historical bid request quantity element 183 may be a one-dimensional array, wherein each element of the array corresponds to a quantity of historical bid requests 153 that were received and that correspond to a content call 129 having a particular characteristic 141 or combination of characteristics 141. Additionally, each historical bid request quantity element 183 may correspond to and comprise data for one historical time period (e.g. one or more days, weeks, etc.).

A forecasted historical bid request quantity element 185 may represent an estimate of quantities of historical bid requests 153 that would be expected to have been recorded in the past. To this end, a forecasted historical bid request quantity element 185 may be, for example, a one-dimensional array that is based on a weighted sum of several historical bid request quantity elements 183. Each historical bid request quantity element 183 may correspond to and comprise data for one historical time period (e.g., one or more days, weeks, etc.).

The bid requests forecasting model 187 may be used to determine an expected bid requests inventory 189. The expected bid requests inventory 189 may be, for example, an expected quantity of bid requests 139 that will be received by the computing device 103 and that would satisfy the targeting criteria 163 of a particular campaign 149. In various embodiments, the bid requests forecasting model 187 may be a two-dimensional array and may comprise data corresponding to multiple historical bid requests 153 and their corresponding characteristics 141, for example.

The bidding engine 176 may be configured to generate and place bids 195 in response to the bid requests 139 received from the exchange devices 109. A bid 195 may be, for example, an offer to purchase the right to have content 159 served in conjunction with a user interface 136. Accordingly, the bid 195 may have a bid amount 197 and possibly other parameters. The bid amount 197 may be the price or quantity of payment exchanged in return for the right to have the content 159 served.

The content server 178 may serve content 159 to the client devices 113 (or other devices) upon receiving an indication that a bid 195 was successful (i.e., the winning bid). The content server 178 may perform additional functionality, such as reporting the served content 159, clicks, post-click activity of the client devices 113, and possibly other information.

The campaign device 116 may comprise, for example, a processor-based system such as a computer system. Such a computer system may be embodied in the form of a desktop computer, a laptop computer, a personal digital assistant, a cellular telephone, a set-top box, a music player, a web pad, a tablet computer system, a game console, or other device with like capability.

The campaign device 116 may be associated with a digital advertising agency, for example, or any entity interested initiating a campaign 149 in conjunction with the computing device 103. A proposed campaign 199 may be, for example, a campaign 149 prior to its targeting criteria 163 or other aspects being set. As such, proposed campaigns 199 may have several sets of targeting criteria 163 that may be used, for example, to obtain different price quotes from the computing device 103.

Next, a general description of the operation of the various components of the network environment 100 is provided. To begin, it is assumed that the network content device 106 is running and prepared to serve network content to client devices 113 that access the network content device 106. Additionally, it is assumed that the exchange device 109 is running and that the inventory forecasting engine 173 and bidding engine 176 have been executed and are running in the computing device 103.

Upon a client device 113 accessing the network content device 106 by using the client-side application 135 or another application, the network content device 106 may obtain information from the client device 113. For instance, the network content device 106 may obtain the behavior/advertising segments to which a user of the client device 113 has previously been associated and/or possibly other information.

The network content device 106 may also begin preparing to transmit the network page 126 or other network content to the client device 113. Additionally, the network content device 106 may transmit a content call 129 and corresponding characteristics 141 to the exchange device 109. For example, the behavior/advertising segments to which the client device 113 is associated, the geographical location of the client device 113, the placement and size of the space available for network content (i.e., the "slot"), the identity of network page 126, and/or possibly other information may be transmitted to the exchange device 109.

Upon the exchange device 109 obtaining the content call 129, the exchange device 109 may generate and transmit the bid requests 139 to multiple computing devices 103. As previously mentioned, the bid request 139 may include at least a portion of the characteristics 141 that were received with the content call 129. By providing the characteristics 141 and possibly other information, the bid request 139 may supply information describing the user interface 136, network page 126 and/or the visitor accessing the network content device 106. As may be appreciated, the computing device 103 may use this information to determine whether to submit a bid 195 to present the content 159 in conjunction with the user interface 136. For example, the information regarding the behavior/advertising segments for the visitor, the geographical location of the client device 113, the placement and size of the space available for network content (i.e., the "slot"), the identity of network page 126, and/or possibly other information may be included with the bid request 139.

Upon obtaining the bid request 139, the computing device 103 may determine whether the bid request 139 has characteristics 141 that would satisfy the targeting criteria 163 for any of the campaigns 149. If so, the bidding engine 176 may generate a bid 195 and transmit the bid to the exchange device 109. Various methods may be used to determine the bid amount 197. For example, the bid amount 197 may be predefined.

If the characteristics 141 would not satisfy any of the campaigns 149, the bidding engine 176 may transmit data indicating that the computing device 103 will not be transmitting a bid 195. Even further, the bidding engine 176 may simply not respond to the bid request 139.

The computing device 103 may store a recording of the bid request 139 as a historical bid request 153. The characteristics 141 of the bid request 139, the time of the bid request 139, and/or possibly other information may be stored in conjunction with the historical bid request 153 in the historical data 146. The computing device 103 may also store a recording of the transmitted bid 195, if a bid 195 was submitted, as a historical bid 156. The bid amount 197, whether the bid 195 was successful (i.e., the "winning" bid), and possibly other information may be stored in conjunction with the historical bid 156 in the historical data 146.

Upon the exchange device 109 receiving the bids 195 from the multiple computing devices 103, the exchange device 109 may determine the highest bid amount 197 that was obtained. The source of the successful bid 195 may be notified and its content 159 may be served in conjunction with user interface 136. Further, a notification that the content 159 was served may be transmitted to the computing device 103 of the winning bid 195. The process of the computing device 103 obtaining bid requests 139 and submitting bids 195 may be repeated several times, and the corresponding data may be stored as historical data 146 in the data store 143.

Upon obtaining a sufficient quantity of historical data 146, the inventory forecasting engine 173 may generate a bid requests forecasting model 187. The inventory forecasting engine 173 may generate a bid requests forecasting model 187, for example, from time to time, upon execution by a user, upon receiving information regarding a proposed campaign 199, or upon any other event.

The inventory forecasting engine 173 may first obtain the historical bid requests 153 corresponding to time periods that are similar to the time period when the inventory forecasting engine 173 is executed. For example, the day of the week (e.g., Sunday, Monday, Tuesday, etc.), whether a date is a holiday, whether the date is popular news day, or any other characteristic probative in determining whether a time period is similar may be considered. For instance, the inventory forecasting engine 173 may obtain the historical bid requests 153 for the last N dates being the same day of the week as today, where N is a predefined number. As another example, the inventory forecasting engine 173 may obtain the historical bid requests 153 data for the M dates that are closest to one year prior to the current date and also are the same day of the week as the current date, where M is a predefined number. Thus, as a non-limiting example, if the current date were a Friday, the historical bid requests 153 of the last 25 Fridays and the 10 Fridays closest to the one year ago may be obtained.

For each of the identified historical time periods, the inventory forecasting engine 173 may create a historical bid request quantity element 183 from the historical bid requests 153. To this end, the inventory forecasting engine 173 may count the number of historical bid requests 153 that were recorded for each targeting criteria 163 and/or combination of targeting criteria 163. In counting the historical bid requests 153 recorded for a combination of targeting criteria 163, logical operators (e.g., or, and, exclusive or, etc.) may be applied.

In the event that a portion of the historical bid requests 153 is unavailable or insufficient, the missing data may be filled using various techniques such as imputation, a moving average, or other methods. Additionally, the inventory forecasting engine 173 may remove outliers of the historical bid requests 153 or perform other types of filtering operations.

The inventory forecasting engine 173 may use the historical bid request quantity elements 183 to create the forecasted historical bid request quantity elements 185. As previously described, the forecasted historical bid request quantity elements 185 may represent expected quantities of historical bid requests 153 for particular time periods. The forecasted historical bid request quantity elements 185 may be based on, for example, a weighted sum of the historical bid request quantity elements 183 as follows:

$$z_n = c_1 x_1 + c_2 x_2 + \ldots + c_n x_n + \epsilon$$

where $z_n$ is the forecasted historical bid request quantity element 185 for a particular time period, $c_n$ are positive weighting values whose sum is one, $x_n$ are the historical bid request quantity elements 183, and $\epsilon$ is a variable representing noise.

The inventory forecasting engine 173 may use the actual historical bid request quantity elements 183 for recent time periods in order to "train" the bid request forecasting model 187. The inventory forecasting engine 173 may use, for example, the last D time periods, where D is a predefined number, in order to determine the weighting values, $c_n$, using various statistical methods. For example, the weighting values may be calculated using a Gaussian process model, a regularized or non-regularized autoregressive integrated moving average (ARIMA) model, a state-space model, or any other statistical method to minimize the squared Euclidean distance between the forecasted historical bid request quantity elements 185 and the historical bid request quantity elements 183.

The residuals between the forecasted historical bid requests 153 and actual historical bid requests 153 may be used to determine a confidence level of the estimated bid requests inventory 189 and/or expected impressions inventory 179. To this end, the calculated weighting values may be applied to the historical bid request quantity elements 183, and the expected historical bid requests 153 may be compared to the actual historical bid requests 153. From the comparison, statistical methods may be applied to the residual values to generate a probability distribution of the residuals. The confidence levels may be stored for use by the inventory forecasting engine 173, risk management, and/or internal controls. Even further, the confidence levels may be transmitted to agents associated with proposed campaigns 199 or used for other purposes.

With the weighting values for the historical time periods determined, the inventory forecasting engine 173 may use the weighting values to create a bid requests forecasting model 187. To create the bid requests forecasting model 187, the inventory forecasting engine 173 may identify historical time periods that are similar to one or more time periods in the future. The time periods in the future may be, for example, the time periods for a proposed campaign 199.

For each of the identified historical time periods, the inventory forecasting engine 173 may select a number of historical bid requests 153, where the number of historical bid requests 153 corresponds to the weighting value associated with the historical time period. The historical bid requests 153 may be selected randomly, according to a predefined process, or by any other procedure. As a non-limiting example, if a weighting value for a historical time period were calculated to be 0.03, the inventory forecasting engine 173 may randomly select 3% of the historical bid requests 153 for that historical date.

The selected historical bid requests 153 for all of the historical time periods may then be "stacked" to form the bid requests forecasting model 187. In various embodiments, the inventory forecasting engine 173 may also re-create the bid requests forecasting model 187 from time to time in order to generate updated bid requests forecasting models 187 based on updated historical data 146.

In order to calculate an expected bid requests inventory 189, the inventory forecasting engine 173 may obtain the data for all of the campaigns 149 and their corresponding booked impressions 166. The inventory forecasting engine 173 may then, for example, associate booked impressions 166 with the historical bid requests 153 that are represented in the bid requests forecasting model 187 and that meet the targeting criteria 163 specified by the various campaigns 149. The associations may be performed randomly, according to a predefined process, or by any other procedure.

The historical bid requests 153 that are associated with the booked impressions 166 may be interpreted as representing expected served impressions 169. The historical bid requests 153 that were not associated with booked impressions 166 may represent opportunities to submit bids 195 on behalf of a proposed campaign 199, for example. As such, the inventory forecasting engine 173 may count the historical bid requests that are not associated with booked impressions 166 and that meet the targeting criteria 163 of the proposed campaign 199. The counted quantity may be considered an expected bid requests inventory 189 for a campaign 149, such as a proposed campaign 199.

The process of associating the booked impressions 166 with the historical bid requests 153 and calculating an expected bid requests inventory 189 may be repeated several times, and an average of the expected bid requests inventory 189 may be calculated. By calculating an average of several expected bid requests inventories 189, a more statistically-reliable expected bid requests inventory 189 may be determined.

The inventory forecasting engine 173 may also determine multiple expected impressions inventories 179 that are expected to be available based on a range of bid amounts 197. To this end, the inventory forecasting engine 173 may first determine the success rates of historical bids 156. In various embodiments, the historical bids 156 may be filtered, for example, based on whether the historical bid 156 was placed during a time period that is similar to the time period for when the expected impressions inventory 179 is being determined. For example, the day of the week (e.g., Sunday, Monday, Tuesday, etc.), whether a date is a holiday, whether the date is popular news day, or any other characteristic probative in determining whether a time period is similar may be used.

Additionally, the historical bids 156 may be filtered based on the characteristics 141 of the historical bids 156. For example, the historical bids 156 may be filtered so that only the historical bids 156 that match or are similar to the targeting criteria 163 of the proposed campaign 199 are selected.

Upon obtaining the historical bids 156, the inventory forecasting engine 173 may determine whether each of the historical bids 156 was successful (i.e., the "winning" bid), and the bid success rates for a range of bid amounts 197 may be determined. The bid success rates may be expressed, for example, as percentages or in any other format. In the event that there is insufficient historical bid 156 data to determine the success rates for one or more bid amounts 197, the missing data may be filled with imputed data, for example.

The bid success rates and the expected bid requests inventory 189 may be used to determine expected impressions inventories 179 over a range of bid amounts 197. For each of the bid amounts 197, the inventory forecasting engine 173 may, for example, multiply the bid success rate with the expected bid requests inventory 189. Thus, a range of expected impressions inventories 179 may be generated that are based on a range of bid amounts 197.

By obtaining the expected impressions inventories 179 over a range of bid amounts 197, an entity associated with the computing device 103 may be in a better position to ensure profitability when entering into agreements with advertisers, for example. Moreover, it may be determined whether the targeting criteria 163 for a proposed campaign 199 are likely to be met while satisfying the obligations of pre-existing campaigns 149.

Figure 2A:
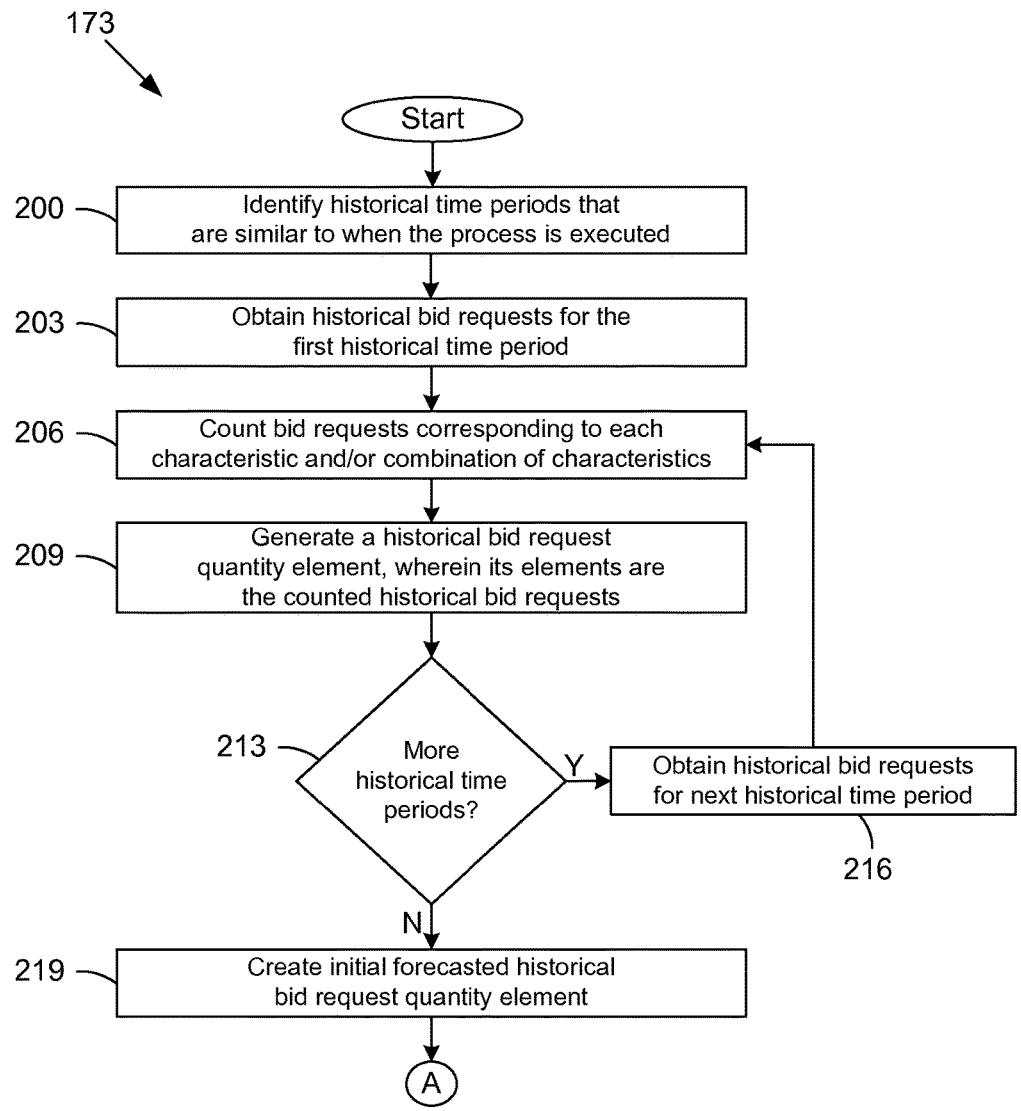
FIGS. 2A-2C is a flowchart illustrating an example of functionality implemented as portions of an inventory forecasting engine executed in a computing device in the network environment of FIG. 1 according to various embodiments of the present disclosure.
Figure 2B:
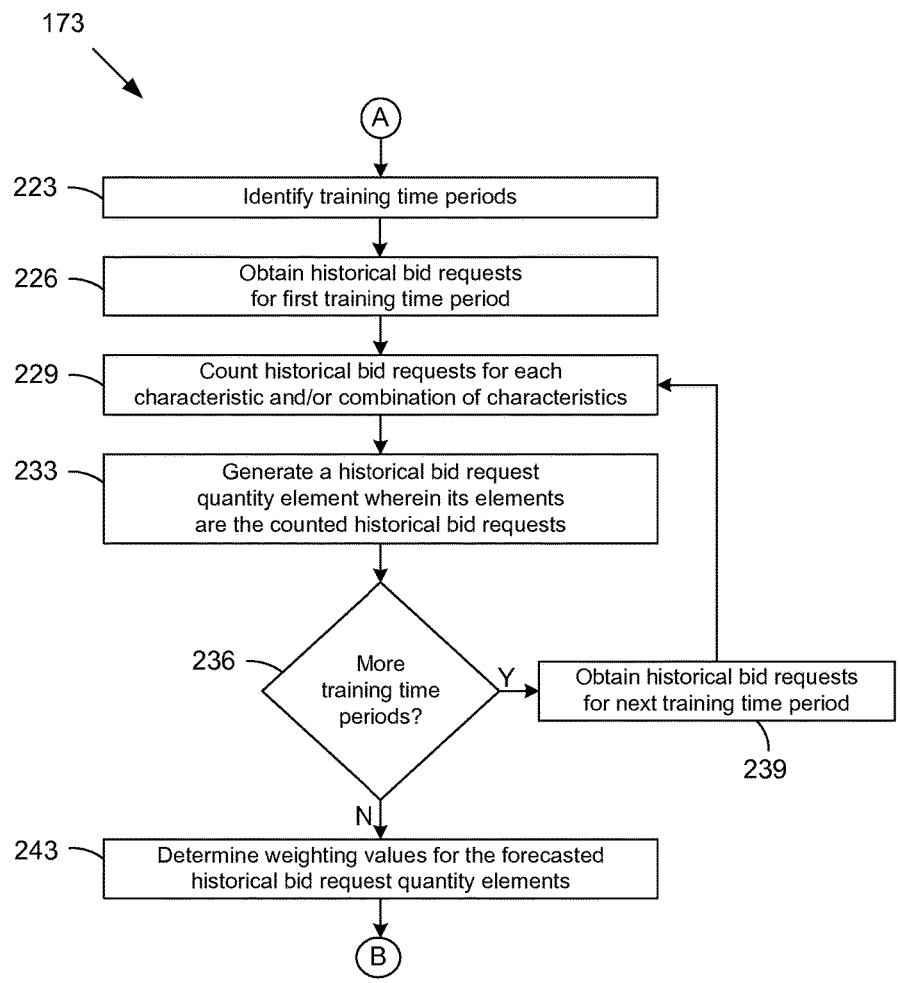
Figure 2C:
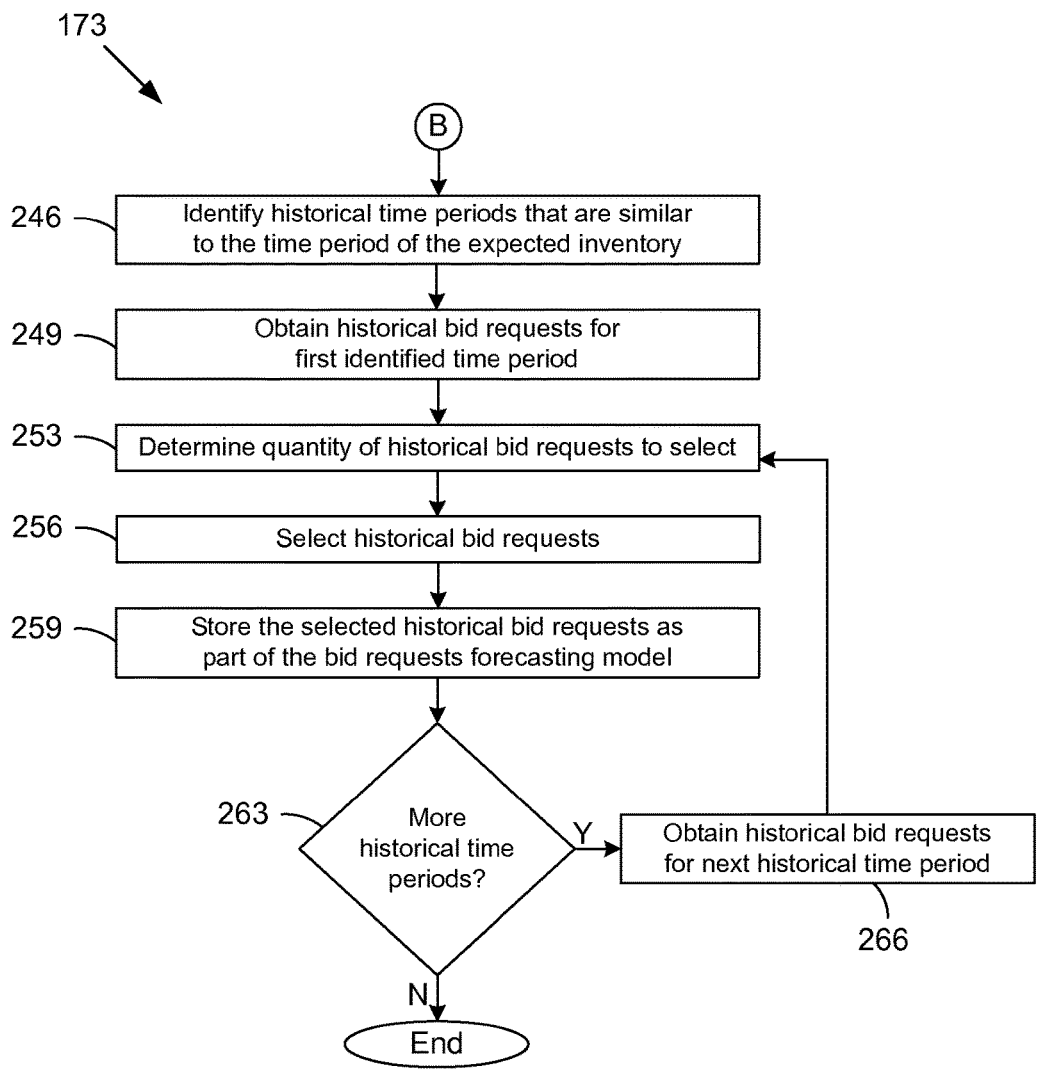

Referring next to FIGS. 2A-2C, shown is a flowchart that provides one example of the operation of a portion of the inventory forecasting engine 173 generating the bid requests forecasting model 187 (FIG. 1) according to various embodiments. It is understood that the flowchart of FIGS. 2A-2C provides merely an example of the many different types of functional arrangements that may be employed to implement the operation of generating the bid requests forecasting model 187 as described herein. As an alternative, the flowchart of FIGS. 2A-2C may be viewed as depicting an example of steps of a method implemented in the computing device 103 (FIG. 1) according to one or more embodiments.

Beginning with box 200, the inventory forecasting engine 173 identifies the historical time periods that are similar to the time period when the inventory forecasting engine 173 is executed. Next, as shown in box 203, the data for the historical bid requests 153 (FIG. 1) for the first identified historical time period is obtained. Thereafter, the historical bid requests 153 (FIG. 1) for each characteristic 141 (FIG. 1) and/or combination of characteristics 141 are counted, as depicted in box 206. For example, the historical bid requests 153 for each behavior/advertising segment and various combinations of behavior/advertising segments may be counted. In various embodiments, the combination of behavior/advertising segments that are counted may be limited in order to decrease computation times. For example, the counted combination may be limited to a predefined number. In various alternative embodiments, only the behavior/advertising segments relevant to a proposed campaign 199 (FIG. 1) may be combined and counted.

As shown in box 209, a historical bid request quantity element 183 (FIG. 1) is then generated. As previously discussed, in various embodiments, the elements of the historical bid request quantity element 183 may be the counted historical bid requests 153. As depicted in box 213, the inventory forecasting engine 173 then determines whether there are more historical time periods that were identified in box 200. If so, the historical bid requests 153 for the next historical time period are obtained by the inventory forecasting engine 173 as depicted in box 216, and the process is repeated as shown.

Otherwise, the inventory forecasting engine 173 moves to box 219 and creates an initial forecasted historical bid request quantity element 185 (FIG. 1). The initial forecasted historical bid request quantity element 185 may be a weighted sum of multiple historical bid request quantity elements 183, wherein the weighting values are undetermined. Next, as shown in box 223, the inventory forecasting engine 173 identifies historical time periods as training time periods to use for determining the weighting values. The inventory forecasting engine 173 then moves to box 226 and obtains the historical bid requests 153 data for the first identified training time period. The historical bid requests 153 for each characteristic 141 and/or combination of characteristics 141 are then counted, as shown in box 229. In various embodiments, the combination of behavior/advertising segments that are counted may be limited in order to decrease computation times. For example, the counted combination may be limited to a predefined number. In various alternative embodiments, only the behavior/advertising segments relevant to a proposed campaign 199 (FIG. 1) may be combined and counted.

As depicted in box 233, the inventory forecasting engine 173 then generates a historical bid request quantity element 183 wherein its elements are the counted historical bid requests 153. The inventory forecasting engine 173 then determines whether there are more historical time periods that were identified as training time periods in box 223, as shown in box 236. If so, the historical bid requests 153 for the next training time period are obtained, as depicted in box 239, and the process is repeated as shown. Otherwise, the inventory forecasting engine 173 moves to box 243 and determines the weighting values for the forecasted historical bid request quantity elements 185.

Moving to box 246, the inventory forecasting engine 173 then identifies the historical time periods that are similar to the time period for when the expected bid requests inventory 189 (FIG. 1) and/or expected impressions inventory 179 (FIG. 1) are being determined. Thereafter, the historical bid requests 153 data corresponding to the first identified historical time period is obtained, as shown in box 249. As depicted in box 253, the inventory forecasting engine 173 then determines the quantity of historical bid requests 153 to select, and the historical bid requests 153 are selected, as shown in box 256. The selected historical bid requests 153 are then stored as part of the bid requests forecasting model 187 (FIG. 1), as depicted in box 259.

Next, as shown in box 263, the inventory forecasting engine 173 determines whether there are additional historical time periods that were identified in box 246. If so, the inventory forecasting engine moves to box 266, obtains the historical bid request 153 data for the next historical time period, and the process is repeated as shown. Otherwise, the process ends.

Figure 3A:
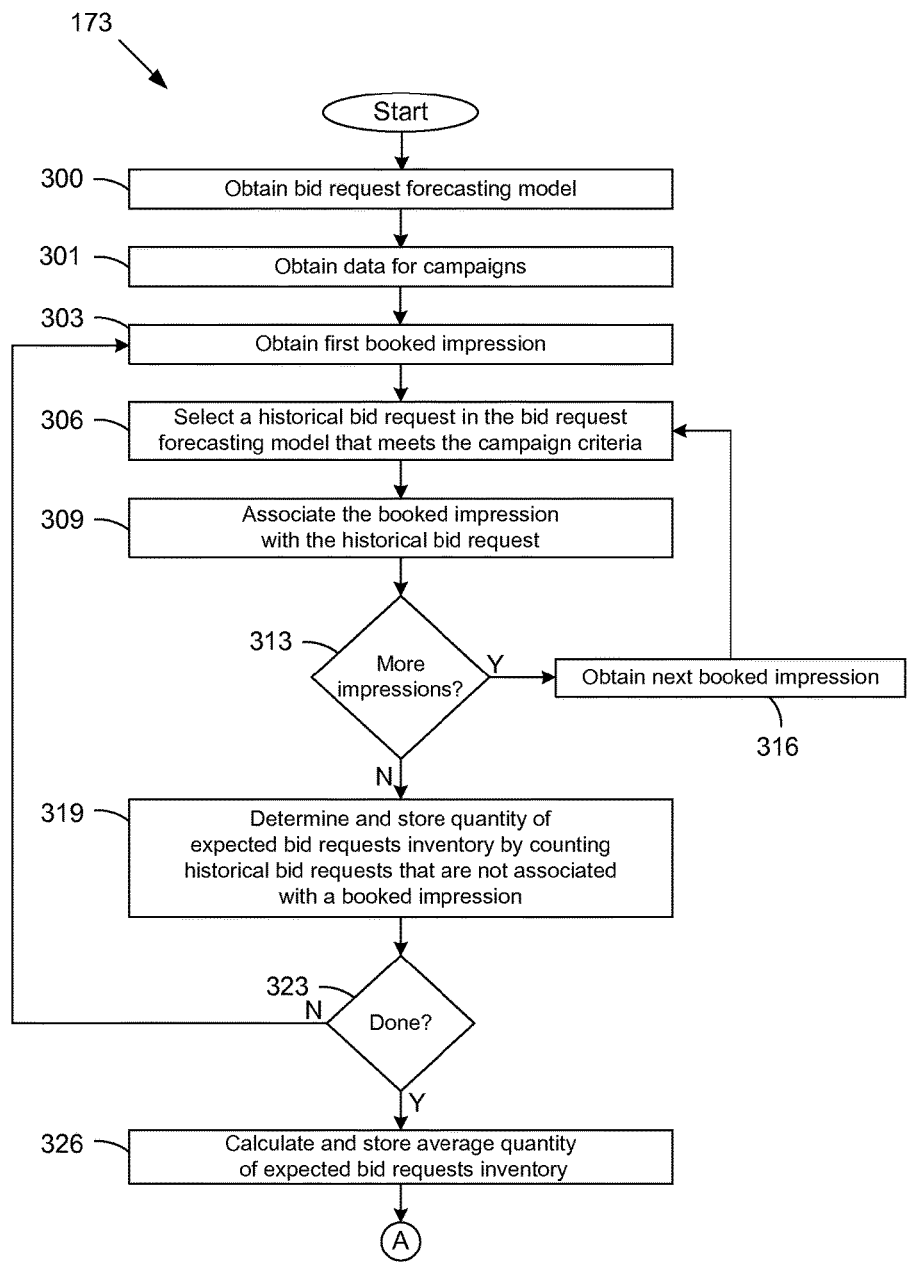
FIGS. 3A-3B is a flowchart illustrating another example of functionality implemented as portions of an inventory forecasting engine executed in a computing device in the network environment of FIG. 1 according to various embodiments of the present disclosure.
Figure 3B:
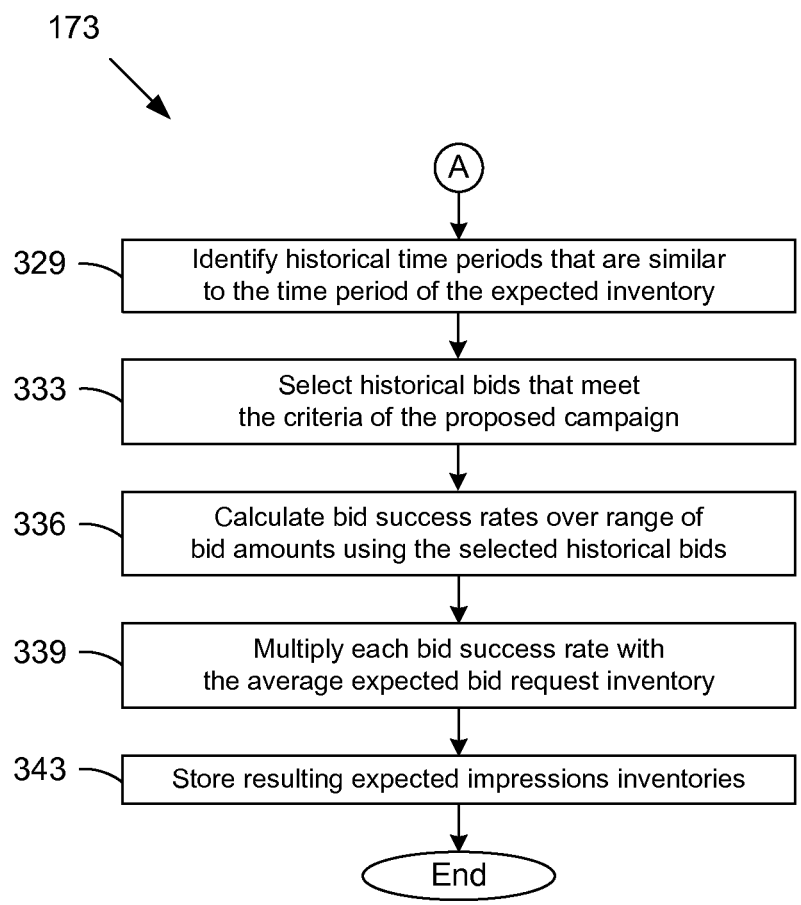

Referring next to FIGS. 3A-3B, shown is a flowchart that provides one example of the operation of a portion of the inventory forecasting engine 173 determining the expected bid requests inventory 189 (FIG. 1) and expected impressions inventory 179 (FIG. 1) according to various embodiments. It is understood that the flowchart of FIGS. 3A-3B provides merely an example of the many different types of functional arrangements that may be employed to implement the operation of determining the expected bid requests inventory 189 and expected impressions inventory 179 as described herein. As an alternative, the flowchart of FIGS. 3A-3C may be viewed as depicting an example of steps of a method implemented in the computing device 103 (FIG. 1) according to one or more embodiments.

Beginning with box 300, the bid request forecasting model 187 (FIG. 1) is obtained. As shown in box 301, the inventory forecasting engine 173 obtains the data for the campaigns 149 (FIG. 1) stored in the data store 143 (FIG. 1). Next, as shown in box 303, the data for the first booked impression 166 (FIG. 1) is obtained. The inventory forecasting engine 173 then selects one of the historical bid requests 153 represented in the bid requests forecasting model 187 that meets the targeting criteria 163 (FIG. 1) for the booked impression 166, as shown in box 306. Thereafter, the inventory forecasting engine 173 associates the booked impression 166 with the selected historical bid request 153, as depicted in box 309. This association may simulate, for example, the booked impression 166 being served in conjunction with the user interface 136 (FIG. 1).

Next, the inventory forecasting engine 173 determines whether there are more booked impressions 166 that have not yet been associated with one of the historical bid requests 153, as shown in box 313. If so, the inventory forecasting engine 173 moves to box 316 and obtains the data for the next booked impression 166, and the process is repeated as shown.

Otherwise, the inventory forecasting engine 173 moves to box 319, where it determines and stores the quantity of the expected bid requests inventory 189 (FIG. 1). The quantity of the expected bid requests inventory 189 may be determined, for example, by counting the number of historical bid requests 153 that are not associated with a booked impression 166.

Moving to box 323, the inventory forecasting engine 173 determines whether it is done associating booked impressions 166 with the historical bid requests 153. The process may be done, for example, after determining R expected bid requests inventories 189, where R is a predefined number.

If the inventory forecasting engine 173 is not done associating booked impressions 166 with the historical bid requests 153, the process returns to box 303, and the process is repeated as shown. Otherwise, the inventory forecasting engine 173 moves to box 326, where it calculates and stores the average quantity of expected bid requests inventory 189.

Next, in box 329, the inventory forecasting engine 173 then identifies the historical time periods that are similar to the time period for when the expected bid requests inventory 189 and/or expected impressions inventory 179 (FIG. 1) are being determined. For those historical time periods, the inventory forecasting engine 173 selects the historical bids that meet the targeting criteria 163 of the proposed campaign 199 (FIG. 1), as shown in box 333. The inventory forecasting engine 173 moves to box 336 and calculates the bid success rates over a range of bid amounts 197 (FIG. 1). The bid success rate may be expressed as a ratio of "winning" historical bids 156 to total number of historical bids 156, for example.

As shown in box 339, the each bid success rate is multiplied with the stored average expected bid requests inventory 189. Thus, the expected impressions inventories 179 are calculated and then stored, as shown in box 343. Thereafter the process ends.

Figure 4:
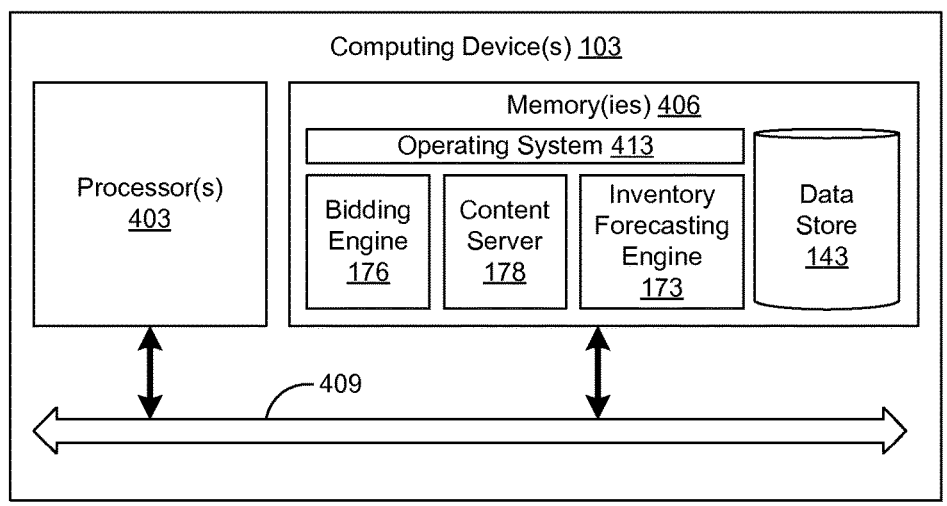
FIG. 4 is a schematic block diagram that provides one example illustration of a computing device employed in the network environment of FIG. 1 according to various embodiments of the present disclosure.

With reference now to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. As such, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the bidding engine 176, the content server 178, the inventory forecasting engine 173, and potentially other applications. Also stored in the memory 406 may be the data store 143 and other data. In addition, an operating system 413 may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 119 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the bidding engine 176, inventory forecasting engine 173, and other various systems described herein may be embodied in software or code executed by general purpose hardware as discussed above. As an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2A-2C and 3A-3B show the functionality and operation of an implementation of portions of the inventory forecasting engine 173. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2A-2C and 3A-3B show a specific order of execution, it is understood that the order of execution may differ from that which is depicted. For example, the order of execution of two or more blocks may be scrambled relative to the order shown. Also, two or more blocks shown in succession in FIGS. 2A-2C and 3A-3B may be executed concurrently or with partial concurrence. Further, in some embodiments, one or more of the blocks shown in FIGS. 2A-2C and 3A-3B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the inventory forecasting engine 173 and bidding engine 176, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It is be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium having at least one computer-executable program stored thereon that, when executed in at least one computing device, causes the at least one computing device to perform operations comprising:

obtaining data for a plurality of historical bid requests for a plurality of historical time periods from a data store, each of the plurality of historical bid requests indicating a past opportunity to submit a bid to present content in conjunction with a particular space of a user interface rendered on a network page, the past opportunity to submit the bid comprising a bid request received from an exchange device that operates an electronic bidding exchange, the exchange device transmitting the bid request in response to obtaining from a network content device a content call that indicates an availability of the particular space in the user interface of the network page;

determining a plurality of historical bid request quantities for each of the plurality of historical time periods, each of the plurality of historical bid request quantities corresponding to at least one of a plurality of content space characteristics;

determining a plurality of expected historical bid request quantities for each of the plurality of historical time periods, each of the plurality of expected historical bid request quantities corresponding to the at least one of the plurality of content space characteristics;

determining a plurality of weighting values for the plurality of historical time periods based at least in part on a comparison between the plurality of historical bid request quantities and the plurality of expected historical bid request quantities;

selecting a quantity of the plurality of historical bid requests for each of the plurality of historical time periods, each quantity being selected based at least in part on a respective one of the plurality of weighting values;

associating a plurality of booked impressions for a plurality of advertising campaigns with the plurality of historical bid requests that are selected, wherein the plurality of booked impressions are associated based at least in part on a plurality of criteria associated with the plurality of advertising campaigns and comprise at least one obligation for the at least one computing device to cause at least one instance of the content to be served in conjunction with the user interface rendered on the network page, the plurality of criteria comprising at least one of a geographical location of a respective client device or a size of the particular space in the user interface of the network page; and determining an expected bid requests inventory based at least in part on the plurality of booked impressions that are associated with the plurality of historical bid requests and a determination of a quantity of the historical bid requests remaining after a subset of the historical bid requests are associated with the plurality of booked impressions, the expected bid requests inventory representing an expected quantity of bid requests that will be received and that would satisfy the plurality of criteria for presenting the content on the user interface of the network page.

2. The non-transitory computer-readable medium of claim 1, wherein the operations further comprise determining an average expected bid requests inventory based at least in part on a plurality of iterations of the plurality of booked impressions being associated with the plurality of historical bid requests that are selected.

3. The non-transitory computer-readable medium of claim 2, wherein the operations further comprise:

determining a plurality of bid success rates for a plurality of historical bid amounts; and determining a plurality of expected impressions inventories for a proposed advertising campaign, the plurality of expected impressions inventories being based at least in part on the average expected bid requests inventory and each of the plurality of bid success rates.

4. The non-transitory computer-readable medium of claim 1, wherein the plurality of criteria comprise a plurality of target advertising segments and a location of the particular space with respect to the network page.

5. The non-transitory computer-readable medium of claim 1, wherein the quantity of the plurality of historical bid requests is a one-dimensional array, wherein an element of the one-dimensional array corresponds to the quantity of the plurality of historical bid requests that were received.

6. The non-transitory computer-readable medium of claim 1, wherein the plurality of criteria comprise a frequency cap for presenting the content to a respective client device.

7. The non-transitory computer-readable medium of claim 1, wherein the content comprises a Hypertext Markup Language (HTML) snippet that is used to render the content on the network page.

8. A system, comprising:

at least one computing device; and a forecasting engine executable by the at least one computing device, the forecasting engine configured to cause the at least one computing device to:

obtain data for a plurality of historical bid requests for a plurality of historical time periods, each of the plurality of historical bid requests indicating a past opportunity to submit a bid to present content in conjunction with a user interface rendered on a network page;

generate a forecasting model to determine an expected bid requests inventory, the forecasting model using a selected quantity of the plurality of historical bid requests for each of the plurality of historical time periods, wherein the selected quantity for each of the plurality of historical time periods is based at least in part on a respective weighting value of a plurality of weighting values for the plurality of historical time periods;

determine a plurality of historical bid requests quantities for each of the plurality of historical time periods, each of the plurality of historical bid requests quantities corresponding to at least one of a plurality of characteristics;

determine a plurality of expected historical bid requests quantities for each of the plurality of historical time periods, each of the plurality of expected historical bid requests quantities corresponding to the at least one of the plurality of characteristics;

determine the respective weighting value for each of the plurality of historical time periods based at least in part on a comparison between the plurality of historical bid requests quantities and the expected historical bid requests quantities; and determine an expected bid requests inventory based at least in part on the forecasting model and a determination of a quantity of the historical bid requests remaining after a subset of the historical bid requests are associated with a plurality of booked impressions, the expected bid requests inventory representing an expected quantity of bid requests that will be received and that would satisfy a plurality of criteria for presenting the content on the user interface of the network page.

9. The system of claim 8, wherein the forecasting engine further causes the at least one computing device to:
   determine a plurality of bid success rates for a plurality of historical bid amounts; and
   determine an expected impressions inventory for a content campaign, the expected impressions inventory being based at least in part on an average of the expected bid requests inventory and at least one of the plurality of bid success rates.

10. The system of claim 8, wherein the forecasting engine further causes the at least one computing device to:
   select the selected quantity of the plurality of historical bid requests for each of the plurality of historical time periods based at least in part on the respective weighting value corresponding to a respective one of the plurality of historical time periods; and
   wherein the plurality of historical bid requests are associated with the plurality of booked impressions based at least in part on at least one of the plurality of criteria.

11. The system of claim 10, wherein the criteria comprise a plurality of target advertising segments.

12. The system of claim 10, wherein the criteria comprise a limit on a serving quantity within a predefined time period.

13. The system of claim 10, wherein the criteria comprise a predefined time period when the content is to be presented.

14. The system of claim 10, wherein the criteria comprise a predefined geographical location where the content is to be presented.

15. The system of claim 8, wherein at least one of the plurality of historical time periods is selected for being a day of a week that is the same as the day of the week that the forecasting engine is executed.

16. The system of claim 15, wherein the at least one of the plurality of historical time periods is selected for being the day of the week that is closest to a year prior to the day that the forecasting engine is executed.

17. The system of claim 15, wherein the at least one of the plurality of historical time periods is selected for being associated with a holiday that is associated with a time period when the forecasting engine is executed.

18. A method, comprising:
   obtaining, in at least one computing device, data for a plurality of historical bid requests for a plurality of historical time periods, each of the plurality of historical bid requests indicating a past opportunity to submit a bid to present content in conjunction with a user interface;
   determining, in the at least one computing device, a plurality of historical bid requests quantities for each of the plurality of historical time periods, each of the plurality of historical bid requests quantities corresponding to at least one of a plurality of characteristics;
   determining, in the at least one computing device, a plurality of expected historical bid requests quantities for each of the plurality of historical time periods, each of the plurality of expected historical bid requests quantities corresponding to the at least one of the plurality of characteristics;
   generating, in the at least one computing device, a forecasting model based at least in part on a selected quantity of the plurality of historical bid requests for each of the plurality of historical time periods, each selected quantity being based at least in part on a respective weighting value of a plurality of weighting values that correspond to the plurality of historical time periods;
   determining, in the at least one computing device, an expected bid requests inventory based at least in part on a determination of a quantity of the historical bid requests remaining after a subset of the historical bid requests are associated with a plurality of booked impressions, the expected bid requests inventory representing an expected quantity of bid requests that will be received and that would satisfy a plurality of criteria for presenting the content on the user interface of a network page; and
   determining, in the at least one computing device, the respective weighting value for each of the plurality of historical time periods based at least in part on a comparison between the plurality of historical bid requests quantities and the plurality of expected historical bid requests quantities.

19. The method of claim 18, further comprising determining, in the at least one computing device, the expected bid requests inventory using the forecasting model.

20. The method of claim 19, further comprising:
   determining, in the at least one computing device, a plurality of bid success rates for a plurality of historical bid amounts; and
   determining, in the at least one computing device, an expected impressions inventory for a content campaign, the expected impressions inventory being based at least in part on the expected bid requests inventory and at least one of the plurality of bid success rates.

21. The method of claim 20, further comprising:
   determining, in the at least one computing device, the expected bid requests inventory using the forecasting model for a plurality of iterations; and
   determining, in the at least one computing device, an average expected bid requests inventory,
   wherein the expected impressions inventory is further based at least in part on the average expected bid requests inventory.

22. The method of claim 18, wherein generating the forecasting model further comprises:
   selecting, in the at least one computing device, the quantity of the plurality of historical bid requests for each of the plurality of historical time periods based at least in part on the respective weighting value that corresponds to a respective one of the plurality of historical time periods; and
   wherein the plurality of historical bid requests are associated with the plurality of booked impressions based at least in part on at least one of the plurality of criteria.

23. The method of claim 22, wherein the plurality of criteria comprise a plurality of target advertising segments.

24. The method of claim 22, wherein the plurality of criteria comprise a predefined size of a space where the content is to be presented.

25. The method of claim 22, wherein the plurality of criteria comprise a predefined time period when the content is to be presented or a predefined geographical location where the content is to be presented.

26. The method of claim 22, wherein the plurality of criteria comprise a frequency cap for presenting the content to a respective client device.

27. The method of claim 18, wherein at least one of the plurality of historical time periods is selected for being a day of a week that is the same as a day of the week that the method is performed.

28. The method of claim 27, wherein the at least one of the plurality of historical time periods is selected for being the day of the week that is closest to a year prior to the day of the week that the method is performed.

* * * * *